SINGLE PASS MAGNETIC READER AND RECORDER

Filed Dec. 23, 1953 2 Sheets-Sheet 1

INVENTOR:
LEENDERT KOSTEN.
BY Hugh A. Kirk
ATTY.

SINGLE PASS MAGNETIC READER AND RECORDER

Filed Dec. 23, 1953 2 Sheets-Sheet 2

INVENTOR:
LEENDERT KOSTEN.
BY Hugh A. Kirk
ATTORNEY

United States Patent Office 2,904,775

Patented Sept. 15, 1959

2,904,775

SINGLE PASS MAGNETIC READER AND RECORDER

Leendert Kosten, The Hague, Netherlands, assignor to Staatsbedrijf der Posterijen, Telegrafie en Telefonie, The Hague, Netherlands Application December 23, 1953, Serial No. 399,964

Claims priority, application Netherlands December 29, 1952

11 Claims. (Cl. 340—174)

Figures 1, 2:
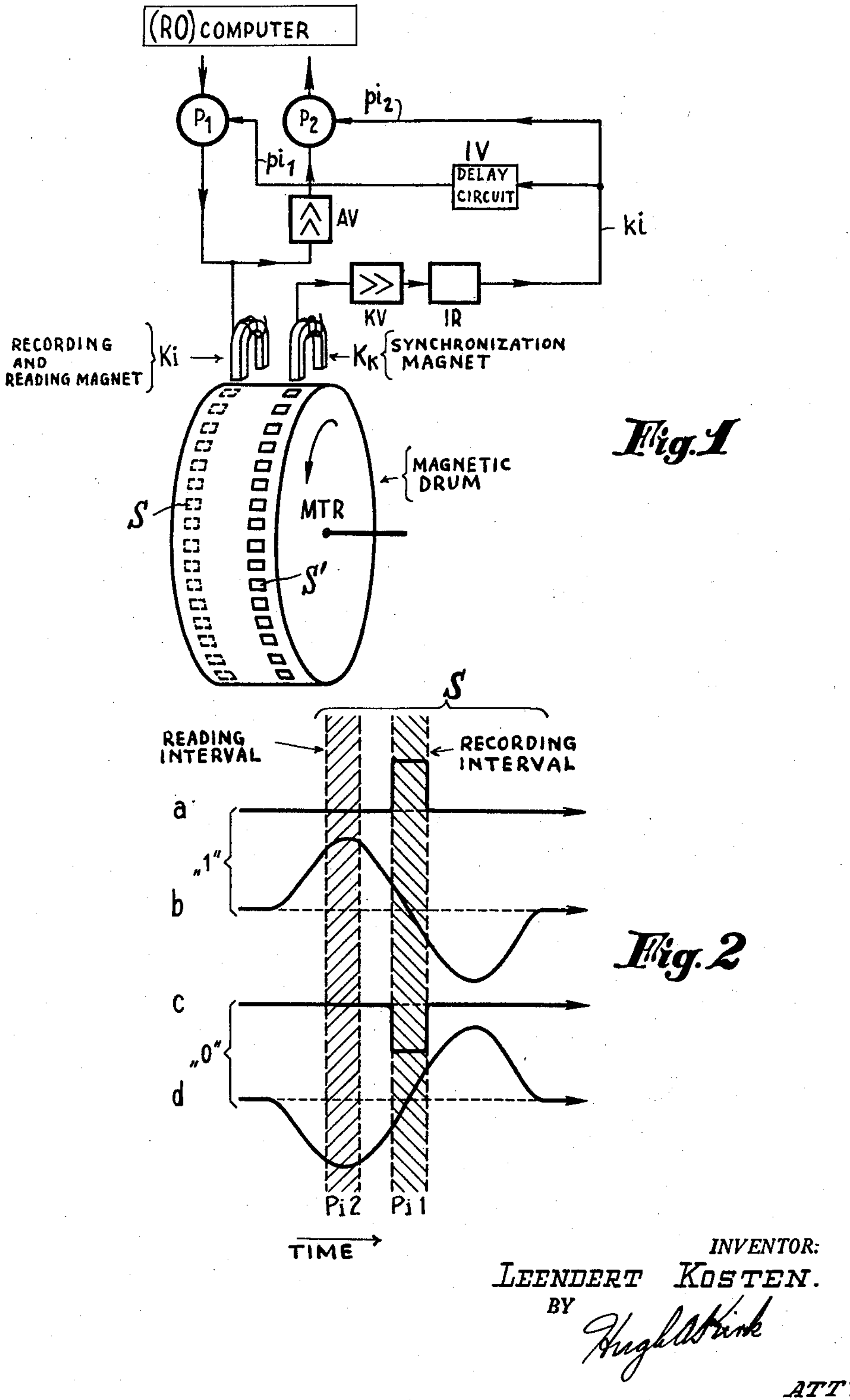

This invention relates to a magnetic reader and recorder system. More particularly, it deals with a single pass non-regenerative type reader and recorder system for intelligence stored on a moving magnetic medium, such as for example, a system for reading and recording binary code pulse signals at intervals along a track on a rotating magnetic drum, which signals may be read and changed during the time for the scanning of the interval allotted on the drum for only one pulse signal.

Previously, only regenerative memory or recording devices could read old information and at the same time replace it in the same place by new information, but such devices, which include mercury tube memory devices and electrostatic memory devices, do not possess the property of preserving the information for an arbitrarily long time. On the other hand, non-regenerative magnetic recording systems, such as movable magnetic wires, tapes, discs or drums, will retain the information stored on them until it is changed, but since much more energy is required for recording than that received from the recording medium by reading, if the recording is done too close in time and/or space on the recording medium to that of the reading, the reader also responds to the carryover of the recording signal, since it could not be damped out sufficiently quickly. Thus, it has been practically impossible to read information stored in a given interval, cell or spot on a drum and then change the information read in that interval, cell or spot without affecting the reading of the next successive interval, if the reading and recording is done at a speed at which either reading or recording separately could normally be done unless of course the cells or spots on the recording medium are more widely spaced and the apparatus is much larger.

Accordingly, it is an object of this invention to provide a simple, efficient, effective, and economic system for substantially simultaneously reading and recording information on a magnetic storing medium.

Another object is to provide such a system in which the reading and recording take place during the same scanned interval on the recording medium.

Another object is to provide such a system in which the reading and recording during a given scanned interval are sufficiently spaced so that the recording may be controlled by the results from the reading of the signal already recorded in that interval.

Another object is to provide such a system in which one and the same reading and recording electro-magnetic head is employed for both reading and recording a signal within the same scanned interval, cell or spot on a magnetic medium.

Another object is to provide such a system in which the reading and recording times during each interval or spot allotted to the storing of signals on a magnetic medium are synchronized accurately with the movement of the recording medium.

Another object is to provide such a system in which the recording of a signal is prevented from affecting the reading of any other signal in the system.

Another object is to modulate all signals applied to the reading circuit at a frequency above the frequency of repetition of the scanning of successive intervals or cells on the recording medium, so as to permit normal damping of the recording signals applied to the reading amplifier before the next interval or cell is to be read, so that the recording signals will not carry over and block or affect the reading of the next successively scanned interval or cell on the magnetic recording medium.

Generally speaking, the system of this invention comprises a moving recording medium such as a wire or tape, or a rotating magnetic disc or drum having tracks thereon, which medium and tracks are divided into spaced intervals, spots or cells for the recordation of intelligence, such as binary code signals in the form of, for example: positive and negative pulses, "on" and "off," or "1" and "0" type signals. These intervals, spots or cells are then scanned by an electromagnetic device or head to which is connected both a recording circuit and a reading circuit. These circuits may then be connected to any suitable processing device for the input and output of information, such as for example an electronic computer. These circuits include gates which are controlled by pulses synchronized with the movement of the spots or cells on recording medium past the electromagnetic head.

These synchronizing pulses may be generated by a separate scanning electromagnetic head which scans a series of spots on a separate track on the recording medium or drum, the intelligence from spots on which separate track may be then detected and amplified and applied to an impulse generator for producing said synchronizing pulses. The synchronizing pulse for controlling the recording circuit preferably is delayed and spaced with respect to the pulse for controlling the reading circuit so that the information read may be detected and operated on in the processing device to control the recording circuit, if necessary, to change the information recorded in that cell or spot before the scanning of that spot has been completed. Thus the reading circuit is gated by the synchronizing pulse slightly before the central portion of each cell or spot is scanned, and its intelligence is then read, since signals applied to such magnetic mediums affect an area around the center of each spot or cell sufficiently large to permit such pre-detection and reading.

Since the information read or detected by the electromagnetic scanning head is several times less than the energy applied to this head for recording or changing the intelligence recorded on the medium, and since both the recording and reading circuits are connected to the same electromagnetic scanning head, the recording signal energy may override its gating time to affect the operation of the reading circuit during its succeeding reading time. One means for preventing such overriding comprises employing a direct current amplifier in the reading circuit between the gate and the electromagnetic scanning head, which D.C. amplifier has voltages applied to its anode and screen grid from batteries or other electrically stable voltage sources, so that the amplifier will not have such an inertia, that its over control by a recording signal will not cause it to be non-responsive to a weaker reading impulse occurring very shortly thereafter.

Another and preferred means for damping out the after effect of the high energy and voltage applied during recording of a signal is to modulate all signals from the electromagnetic head at a much higher frequency than that of the signals recorded on the magnetic medium and the interval between the scanning of successive cells or spots on the magnetic medium, so that any override or overcontrol can be readily damped out in the inherent resistance-condenser (RC) time constant circuits of the high frequency amplifier and detector then required in such a reading circuit for all such modulated signals. This modulating frequency is so high that even if a few damped oscillations did occur after the recording circuit were cut off they would all have died out before the time the next successive cell or spot is to be scanned. The modulating device may comprise a ring modulator with rectifiers and coupling transformers, which may be adjusted "out of balance" by means of a variable resistor across its ring circuit and a voltage bias; so as to read the two different types or binary signals recorded in the intelligence cells on the recording medium.

Figure 3:
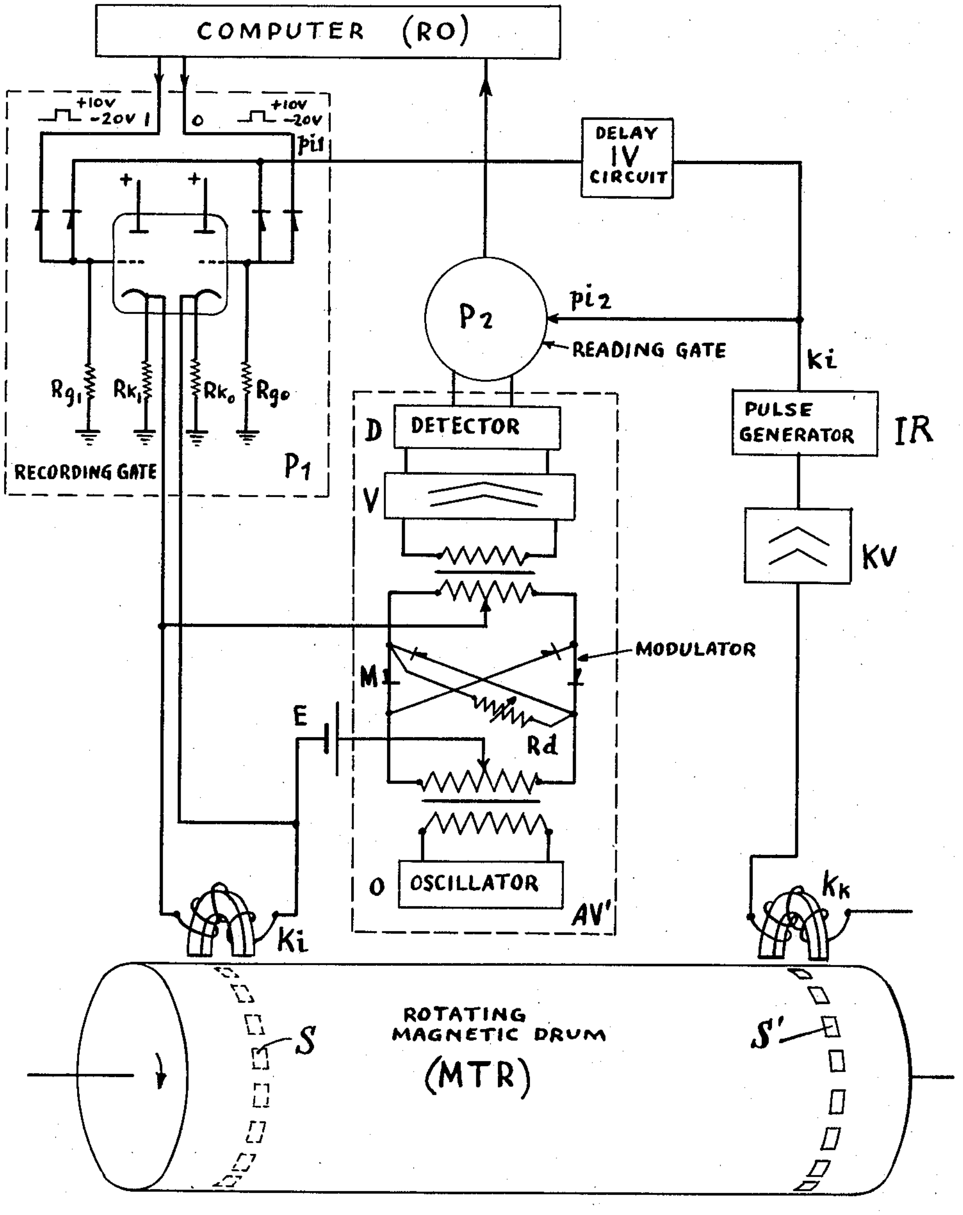

The foregoing mentioned and other features and objects of this invention and the manner of attaining them will become more apparent and the invention itself will be best understood by reference to the following description of embodiments of this invention taken in conjunction with the accompanying drawings, wherein:

Fig. 1 is a schematic block diagram of the circuit of this invention adapted to a rotating magnetic drum recording machine having a separate synchronizing circuit scanning a fixed track of cells on the drum;

Fig. 2 is a graph of voltage against time wave forms of applied and read or detected binary signals "1" and "0" which occur during the scanning of one intelligence cell on the recording medium shown in Fig. 1, showing the spaced intervals at which the waves are read and recorded; and Fig. 3 is a mixed block and wiring diagram of a reading circuit and a recording circuit according to the diagram of Fig. 1, showing the preferred embodiment of a high frequency modulator in the reading circuit.

*Magnetic recording medium*

Referring to Fig. 1 or 3 the specific type of magnetic recording medium disclosed comprises a rotating drum MTR having a magnetic surface, which surface is divided into tracks of equally spaced cells or spots S which correspond to the intelligence intervals or areas which may be changed in magnetic polarity or magnetized and demagnetized by application of opposite directional currents to the electromagnetic recording and reading head K*i*, which is positioned to scan the track of cells S as the magnetic drum MTR is rotated in the direction of the arrow.

Also on the drum MTR may be provided an additional series or track of permanent intelligence cells or spots S′ which may be scanned by a separate electromagnet K*k* which permanent spots S′ may induce pulses in a synchronizing circuit for synchronizing the reading and recording intervals of each spot S by the electromagnetic head K*i*. Thus, the track of spots S′ remains permanently energized for producing synchronizing pulses, while the spots S may be magnetized or demagnetized or magnetized with either polarity in accordance with recording signals applied through the scanning head K*i*.

The surface or coating of the magnetic drum MTR may comprise strips or a sheet of plastic material impregnated with ferrous oxide or iron dust or powder which may be magnetized by pulses of current applied to the coils of the electromagnets K*i* and K*k*, which magnetism in the particles is retained relatively permanently until changed by an opposite current applied through an adjacent electromagnet.

In order to save as much space as possible and record as many signals as possible on a given surface of a magnetic recording medium or drum, the poles of the electromagnets K*i* and K*k* are made as sharp and narrow as possible and placed as close together as possible, but in spite of this fact when they are energized there is a definite diffusion of the magnetic field causing the magnetization of the particles in an area beyond the exact spot of the poles adjacent the recording medium.

*Synchronization circuit*

Referring again to Fig. 1 or 3 there is shown connected to the synchronizing scanning electromagnet K*k*, a pulse generating circuit for synchronizing the recording and reading circuits of this invention. This synchronizing circuit may comprise an amplifier KV for amplifying the energy induced in the magnet K*k* by the permanently magnetized spots or cells S′ and then these amplified pulses may be passed to an impulse generator IR from which sharp pulses may be conducted through conductor *ki* both directly to conductor *pi2* to the gate circuit P2 of the reading circuit and to a delaying circuit IV to produce delayed pulses which are conducted through conductor *pi1* to the gate circuit P1 of the recording circuit. The delay circuit IV which feeds conductor *pi1* delays the impulses in the circuit *ki* from the impulse generator IR an amount corresponding to the distance between the leading edges of the two shaded areas P*i*2 and P*i*1 in Fig. 2.

*Type of signals*

Referring now specifically to Fig. 2, for the purpose of illustration of the principle of this invention the type of signals which are read and recorded are binary code signals which correspond to plus and minus, off and on, "1" and "0" or similar binary code signals. The signal which is applied to the recording head for recording on the drum MTR is shown by wave forms *a* and *c*, *a* corresponding to the "1" type signal, and *c* corresponding to "0" type signal, which signals are equal and opposite.

The type of signal actually recorded, which corresponds to these applied signals *a* and *c*, and which is read from a spot S on the drum MTR corresponds to the wave forms *b* and *d*, respectively, which shows that the energy producing the signal affects the magnetic particles in the drum surface both prior to and after the duration of the gating period corresponding to second and downwardly shaded vertical area P*i*1 when the synchronization pulse is applied through conductor *pi1*. These waves *b* and *d* correspond to single cycle sine waves 180° out of phase with each other, with centers at the center of the spots S. Thus, when these extended sine waves *b* and *d* are read during the reading interval corresponding to first and upwardly shaded vertical area P*i*2 when the synchronization pulse is applied through conductor *pi2*, which area and time is spaced prior to the recording interval P*i*1, substantially a maximum or minimum, respectively, of magnetic energy is detected by the scanning electromagnet K*i*. Accordingly, recorded signals *b* and *d* may be preread and detected a sufficient time before their centers are scanned so they may be changed, if such is desired, according to the information given in the computer or processing circuit RO. This spread of the recorded signal energy around a spot S is herein an advantageous property of a magnetic recording medium to which the system of this invention is directed and applied.

*The recording or writing circuit*

Generally speaking, the recording or writing circuit comprises a gate circuit P1 and the electromagnetic scanning head K*i* as shown in Figs. 1 and 3, which circuit permits, at predetermined intervals P*i*2, the transmission of either positive or negative, plus or minus or "1" or "0" signals *a* or *c* respectively to the electromagnetic recording head K*i* from their generating, processing or computer circuit RO.

A specific embodiment, however, of such a recording circuit is disclosed more in detail in the dotted block P1 shown in Fig. 3, in which the gate circuit may comprise a double triode tube, the grids of which are respectively connected through separate rectifiers to the conductor *pi1* from the delay circuit IV, and also through separate rectifiers to separate conductors from the processing or computer circuit RO, the left one of which is for "1" type signals and the other or right one of which is for "0" type signals. Each of the two different signals controls a different half of the double triode tube and is applied to opposite ends of the coil or winding of the electromagnet K*i*, so as to produce correspondingly different north and south or plus and minus poles on the magnet K*i*. For example, the grids of the double triode in this circuit may be normally maintained at a potential of about minus 20 volts and the recording and synchronizing pulses may be plus 10 volts each.

Thus, if a "1" type signal is to be recorded in a given cell S, the left hand conductor from the computer RO is given a potential of plus 10 volts so that as soon as the gating impulse of plus 10 volts from the conductor *pi*1 is also applied to the grid of the left hand side of the double triode, the potential of that grid rises to plus 10 volts and the anode current begins to flow in one direction through the winding of the recording magnet head K*i*. Part of this current, however, flows through the resistor R*k*1 and part through the series connection of the coil on the magnet K*i* and resistance R*k*0. These resistors R*k*1 and R*k*0, however, are so dimensioned that the partial current through resistor R*k*0 is large enough for the writing of the signal "1" in a given cell S on the drum MTR. Thus the series connection of the cathode resistors R*k*1 and R*k*0 is only perceptible as an attenuation of the few decibels (db), which also may be applied during the operation of the reading circuit described below.

The recording or writing of the signal "0" is accordingly done in the same manner, but through the energization of the right hand triode of the double triode tube in circuit P1 and the right hand conductor to the grid of that tube from the computer RO. The flow of the current through the coil of the scanning magnet K*i* is then in the opposite direction, so that a wave corresponding to wave *d* in Fig. 2 is recorded in spot S instead of a wave *b* as would be recorded when pulse "1" is applied.

*The reading circuit*

The reading circuit, generally speaking, comprises a simple gate circuit P2, a signal amplifying circuit AV or AV′, and the electromagnetic scanning head K*i* as shown in Figs. 1 and 3, which circuit permits the transmission of "1" or "0" type signals recorded on spots S to the computer RO during predetermined scanning intervals P*i*2. Thus both the recording and the reading circuits are directly connected to the same conductors and same coil of the magnet K*i* and the current and voltages applied to the coil of the magnet K*i* from the recording circuit are also applied to the reading circuit.

The recording voltages, however, are much higher than those which are read, and lie in a region of about 80 db above the level of a reading signal. Therefore, if an ordinary alternating current amplifier of the type for frequencies corresponding to the scanning rate of the intervals S and signal waves *b* and *d* is employed in circuit AV or AV′, then the normal resistance-condenser or time constant circuits in this amplifier generally would not fully damp out the recording signal after its cutoff at the end of interval P*i*1 before the next succeeding spot S is scanned by the interval P*i*2, and thus some of the undamped recording signal oscillations would override the reading of this next subsequent spot S and give an erroneous indication through the gate P2 to the computer circuit RO. Accordingly, it is important that any carry over or undamped frequency components of such a loud recording signal are not also applied to the gate circuit P2 when this gate is opened by the synchronizing impulse when it occurs in conductor *pi*2 to effect or distort a read signal.

This overriding or carryover may be avoided by employing a direct current (D.C.) type amplifier AV in the circuit (see Fig. 1) in which its amplifier tube has its anode and screen grid voltages biased from batteries or from electronically stable voltage sources, so that the D.C. amplifier circuit will have no inertia of its own to be damped and will be cut off right after no signal is applied to it. Such an over control of a D.C. amplifier does not entail non-responsiveness, but it is not as advantageous a solution to the problem as the circuit described below in relation to Fig. 3.

According to the preferred embodiment of this invention the AV circuit shown in Fig. 1 is replaced by the AV′ circuit shown in the dotted rectangle in Fig. 3 which may comprise a high frequency oscillator O, a ring type modulator M, a high frequency amplifier V, and a detector circuit D. The modulator M may be connected from across the coil of the scanning magnet K*i* to the center of a pair of coupling transformers, one of which is coupled to the high frequency oscillator O and the other which is coupled to the high frequency amplifier V. The particular ring modulator circuit shown comprises a pair of crossed connectors and a pair of direct connectors, each of which is provided with a rectifier, and the circuit is preferably adjusted to be "out of balance" by means of a variable resistor R*d* across one of the crossed connectors and placing a polarizing voltage source E in one of the conductors to the magnet K*i*, which produces the "out of balance" condition so that both "1" type and "0" type of signals may be differently detected by the modulator M.

According to this circuit AV′ the lower frequency reading and recording type of signals are modulated in the modulator M on a higher frequency carrier wave produced in the oscillator O, which carrier wave frequency is materially above the frequency of the repetition rate of the scanning of the cells S or of the frequency of the recording or recorded signals shown according to wave forms in Fig. 2, and this so modulated carrier wave is then amplified in a high frequency A.C. amplifier V from which the lower frequency signals are detected in a detector circuit D, so that only the lower frequency signals are passed to the gate circuit P2, which may be similar to the circuit P1 as previously described being controlled through a double triode by connection of the synchronizing pulse through the conductor *pi*2. The normal decay time caused by the resistance-condenser (RC) time constant circuits is this high frequency amplifier V is such that even the highest over control voltage signals applied to the amplifier V will be normally damped out within a few oscillations after the signal is cut off and therefore, even if the high frequency is amplified, all carry over will be completely damped and spent before the time occurs for the reading of the next low frequency recorded signal in the next cell S scanned by the magnet K*i*. The detector circuit D also can contain limiting rectifiers to prevent the amplitude of the higher voltage signals applied to it during recording, from being over a certain maximum voltage level.

While there is described above the principles of this invention in connection with specific apparatus, it is to be clearly understood that this description is made only by way of example and not as a limitation to the scope of this invention.

What is claimed is:

1. In a system for storing signals on a magnetic medium including signal reading and recording devices, means for moving the recording medium past said reading and recording devices, and means for synchronizing the operation of said reading and recording devices with definite spots on said recording medium, the improvement comprising: means for both reading and recording a signal on said medium by said devices during the scanning of one of said spots, comprising: a single spot scanning electromagnet for both said reading and recording devices, means connected to said electromagnet for reading a recorded signal detected by said electromagnet in a given spot, said reading means comprising a high frequency amplifier and a gate circuit connected to said high frequency amplifier, means connected to said electromagnet for recording a signal in said same given spot by said magnet, and means connected to said reading means for preventing the operation of said recording means from affecting the operation of said reading means at the next successively scanned spot, said means for preventing the effecting of said reading means including a modulator connected to said electromagnet, a high frequency oscillator connected to said modulator with the output of said modulator being connected to said high frequency amplifier, and a demodulator connected to said high frequency amplifier, said oscillator having a frequency greater than that of the repetition rate of the signals that are being successively scanned and stored in said spots.

2. A system according to claim 1 wherein said means for recording a signal comprises a computing device and a gate circuit connected to said computing device.

3. A system according to claim 1 wherein said signals are binary signals and said modulator is an "out of balance" ring type modulator.

4. A system according to claim 1 wherein said amplifier and detector include time constant circuits for normally damping any over control of said amplifier before the next storing spot is scanned on said storing medium.

5. A system according to claim 1 wherein said modulator includes limiting rectifiers for preventing its over control by connection of said reading device to said recording device through said electromagnet.

6. A magnetic drum pulse storing system having a rotating magnetic drum, a timing pulse system of a given frequency, and reading and recording devices, the improvement comprising: means for both reading and recording an impulse on said drum by said devices during one impulse period of said given frequency comprising: a single reading and recording electromagnet, a high frequency amplifier means connected to said magnet for reading a recorded impulse detected by said magnet, means connected to said magnet for recording an impulse through said magnet, and a substantially high frequency modulator means connected to said reading amplifier means for restoring said amplifier and preventing said recording means from affecting the reading of an impulse in the subsequent impulse period.

7. A system according to claim 6 including means operated by said timing pulse system for synchronizing the operation of said reading and recording means with recorded impulses on said drum.

8. A system according to claim 7 wherein said timing pulse system comprises an amplifier, an impulse generator connected in series from said timing means operated by said impulses on said drum to said reading means.

9. A system according to claim 8 including a delay circuit connected between said impulse generator to said recording means, whereby said means for recording an impulse is controlled by a pulse delayed with respect to the pulse for controlling said means for reading a recorded impulse.

10. In a magnetic memory system having a scanned magnetic signal storing medium, a signal processing circuit, means to read signals recorded in successive information storing cells on said medium and for supplying them to said processing circuit, means to record new signals derived from said processing circuit successively in said cells on said medium, and means for synchronizing the scanning of said cells with the operation of said reading and recording means, the improvement comprising: a single reading and recording head for both said reading and recording means, separate gate means operated by said synchronizing means for controlling said reading means before said recording means within the scanning interval for each information storing cell on said medium, and means connected to said reading means for preventing the operation of said recording means from affecting the operation of said reading means at the next successively scanned information cell, said means for preventing the effecting of said reading means comprising a modulator circuit including an oscillator having a frequency higher than the scanning rate of said pulses by said reading and recording head, and a high frequency amplifier and detector connected in series from said oscillator.

11. A system according to claim 10 wherein said high frequency amplifier and demodulator include resistance-condenser circuits whose normal decaying time is less than the time between the operations of said gate means for said recording means and said reading means.

References Cited in the file of this patent

UNITED STATES PATENTS

| | | |
|---|---|---|
| 2,685,682 | Sepahban | Aug. 3, 1954 |
| 2,700,148 | McGuigan | Jan. 18, 1955 |

OTHER REFERENCES

Publication, Proc. of IRE, October 1953, pp. 1438–1444.